United States Patent Office 3,432,008
Patented Mar. 11, 1969

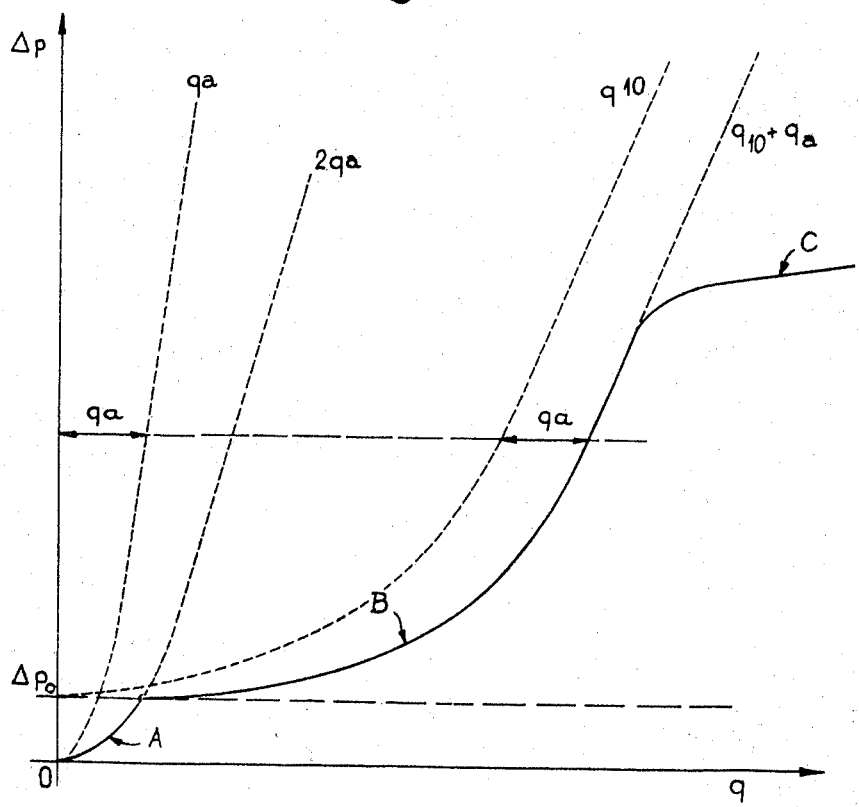

3,432,008
HYDRAULIC SHOCK ABSORBERS
Edmond Henry-Biabaud, Paris, France, assignor to Societe Anonyme Andre Citroen, Paris, France
Filed May 1, 1967, Ser. No. 634,929
Claims priority, application France, Sept. 28, 1966, 78,022
U.S. Cl. 188—94                    2 Claims
Int. Cl. F16d 57/00; F16k 31/12, 31/36

ABSTRACT OF THE DISCLOSURE

The invention relates to a hydraulic shock absorber intended for example for the suspension system of a vehicle, of the type comprising a body separating two compartments filled with a fluid, a main valve slidably mounted in said body and a return spring. The shock absorber is characterised in that the main valve has a longitudinal duct formed therethrough and acts as a seat to a secondary valve urged against said seat by a calibrated spring. The main valve constitutes in conjunction with the shock absorber body and said secondary valve annullar jets communicating with said longitudinal duct through orifices formed in the lateral wall of said duct.

---

In a suspension system the study of the damping action produced by means of a hydraulic device consists in determining on the one hand the most adequate damping law and on the other hand the technological characteristics of the apparatus capable of embodying the selected damping law. This law must be obtained with precision and should not be modified as a function of time and/or temperature.

It is the essential object of this invention to provide a hydraulic shock absorber intended for example for equipping the suspension system of an automotive vehicle, which is of the type comprising a body separating two compartments filled with fluid, a main valve slidably mounted in said body, and a return spring, this shock-absorber being characterised essentially in that the main valve in which a longitudinal passage is formed acts as a seat to a secondary or auxiliary valve urged against said seat by a calibrated spring, said main valve forming in conjunction with the body of the shock-absorber and said secondary valve a series of annular jets communicating with said longitudinal passage by means of orifices formed through the lateral wall of said passage.

In order to afford a clearer understanding of this invention a specific form of embodiment thereof will now be described with reference to the accompanying drawing showing the application thereof to a hydropneumatic suspension system taken by way of example. In the drawing:

FIGURE 2 is a diagram plotting the variations in the loss of pressure $\Delta_p$ of the fluid as a function of the output $q$ flowing from one to the other compartments of the suspension system.

Figure 1:
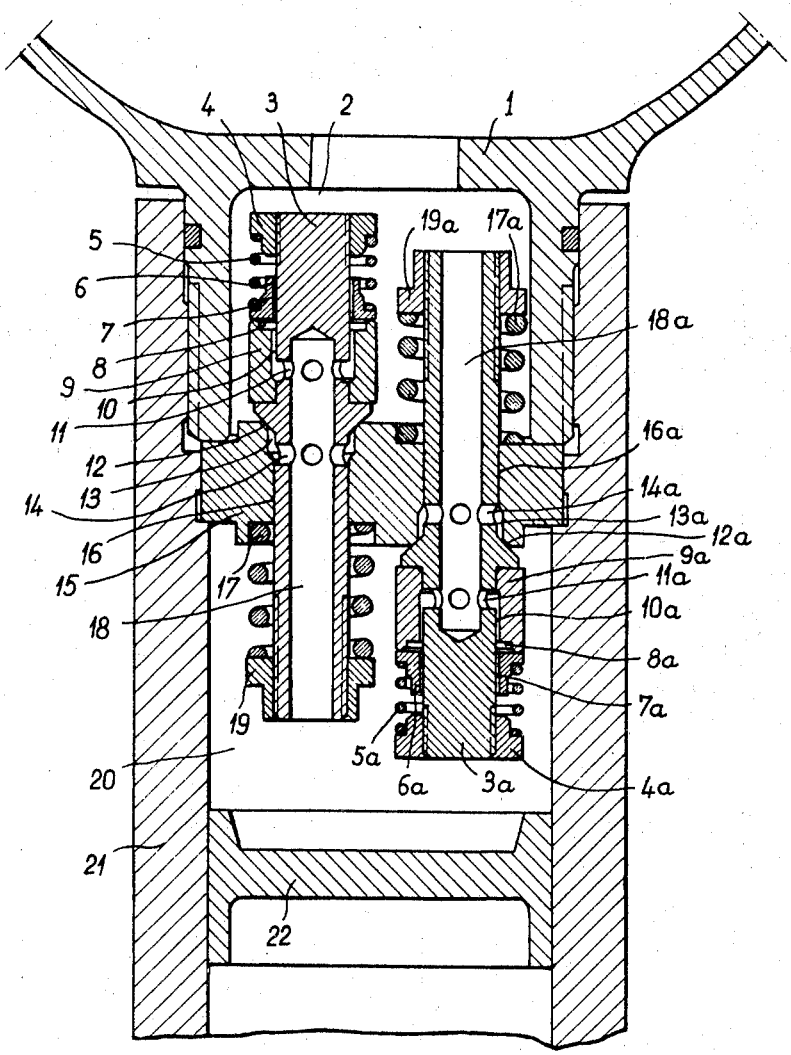
FIGURE 1 is a longitudinal sectional view of this shock absorber.

Referring first to FIGURE 1 of the drawing the lower portion of a hydropneumatic unit 1 has secured thereto a cylinder 21 in which an intermediate partition or body 15 of a shock absorber according to this invention is secured so as to divide the cylinder 21 into two chambers 2 and 20, one chamber being adjacent to the hydropneumatic unit 1 and the other receiving the piston 22 of a suspension system filled with a suitable fluid. The shock absorber proper comprises two oppositely arranged main valves 3 and 3a which are of same design and differ only by their adjustment; one main valve, for example 3, controlling the loss of pressure in the "compression" direction, the fluid flowing from chamber 20 to chamber 2, the other main valve 3a controlling this loss in the "expansion" direction, the fluid flowing in this case in the opposite direction; however, it may be noted that the shock absorber according to this invention can also operate with a single main valve, for example valve 3, the fluid flowing in this case from chamber 2 to chamber 20 through means known per se and therefore not described herein.

The main valves 3, 3a guided in bores 16, 16a respectively formed through the partition 15 are urged against their seats 12, 12a of this partition by means of calibrated and preferably helical or coil compression springs 17, 17a, the compression of these springs being advantageously adjustable by means of nuts 19, 19a. Ducts 18, 18a communicate respectively the chambers 20 and 2 with annular grooves 13, 13a through the medium of orifices 14, 14a formed in the shanks of the main valves 3 and 3a.

On the other hand, sockets 9, 9a secured to these main valves preferably by force fitting and formed with annular grooves 8, 8a, constitute in conjunction with said main valves 3, 3a annular clearances 10, 10a acting as jets communicating with the aforesaid ducts 18, 18a through orifices 11, 11a formed in the valves 3 and 3a, as shown. The sockets 9, 9a act as seats to secondary or auxiliary valves 6, 6a urged by springs 5, 5a, preferably helical or coil compression springs, advantageously calibrated and adjustable by means of nuts 4, 4a, said secondary or auxiliary valves 6, 6a forming annular jets 7, 7a in conjunction with the shanks of the main valves 3, 3a.

The above-described shock absorber operates as follows under "compression" conditions:

As long as the speed of piston 22 remains below a predetermined value, the secondary valve 6 and main valve 3 remain seated. Thus, the fluid can flow from space 20 to space 2 along two paths: on the one hand, duct 18, orifices 11, jet 10, and jet 7, and on the other hand jet 7a, jet 10a, orifices 11a and duct 18a. As the jets 10 and 10a have a cross-sectional area considerably greater than jets 7 and 7a, the section A of the thick-line curve shown in FIGURE 2 is formed only by jets 7 and 7a operating in parallel.

If the speed of piston 22 increases sufficiently, the loss of pressure in jets 7 and 7a becomes such that the pressure produced in groove 8 will lift the secondary valve 6. As the spring 5 is extremely flexible, the loss of pressure produced by this secondary valve 6 may be considered as constant and equal to the lifting pressure $\Delta_{po}$. Under these conditions, the output of the fluid circulating from space 20 to space 2 will flow along two paths, on the one hand the above-defined path 7a, 10a, 11a and 18a, and on the other hand duct 18, orifices 11, jet 10, groove 8 and the circular slot formed by the secondary valve 6 and its seat.

The output corresponding to the section B of the thick-line curve (FIGURE 2) is obtained by adding, for a given pressure loss $p$, the output $q$ 10 circulating in the jet 10 (which is zero when $\Delta_p < \Delta_{po}$) and output $q$ $a$ in jet 7a.

In other words, the output $q10$ circulating in jet 10 is equal to the total output $q$ minus the output $q$ circulating in jet 7a. Thus, the section B of the thick-line curve (FIGURE 2) is obtained by measuring the loss of pressure in the output circulating through jet 10 and adding $\Delta_{po}$ thereto.

If the speed of piston 22 becomes particularly high, for example when the wheel associated with the shock absorber crosses a pot-hole at high speed, the pressure differential between chambers 20 and 2 is such that the secondary valve is unseated.

Under these conditions the pressure differential between 20 and 2 is dependent on the calibration of spring 17. This last phase is shown at C in the same thick-line curve of FIGURE 2.

Of course, the "expansion" operation of the above-described shock absorber would be similar to the "compression" operation, the valves 3 and 3a being the same, except for their adjustment, as already explained hereinabove.

As the above described shock absorber comprises only gaged orifices and helical springs, its characteristics remain constant with time and scarcely subject to variations in case of changes in the fluid temperature.

Moreover, the use of annular jets makes the operation of the device particularly noiseless in comparison with the operation of devices equipped with simple orifices.

Finally, the specific arrangement of the permanent leakage jets 7 and 7a is advantageous in that it permits of dividing by two the "parallel" output of the device.

Although the above description refers mainly to a specific form of embodiment of the shock absorber constituting the subject-matter of this invention, it would not constitute a departure from the basic principle of the invention to bring various modifications and variations thereto, as will readily occur to anybody skilled in the art.

I claim:
1. A hydraulic shock absorber comprising a cylinder, a fixed body dividing said cylinder into two compartments filled with fluid, a valve seat upon said body, a main valve having a stem with a longitudinal bore with transverse holes slidably mounted in said body cooperating with said seat, an adjustable nut at an end of said stem, a return spring located upon said stem between said body and said nut, an auxiliary valve mounted on said stem, a calibrated spring supporting said auxiliary valve, a seat upon said main valve cooperating with said auxiliary valve, a socket fitted upon said stem upon which said seat is mounted, said seat of said auxiliary valve forming with said stem a first annular jet communicating with said longitudinal bore through said holes, said first jet opening under the seat of said auxiliary valve, and a second annular jet formed by said auxiliary valve and said stem of a cross section less than that of said first jet opening in one of said chambers and communicating with said first jet.

2. A hydraulic shock absorber as set forth in claim 1 comprising two main valves each with an auxiliary valve mounted in opposition top to bottom in such a way so that whatever the direction of flow of fluid in said cylinder, the liquid avails itself of said second jet of each valve when said auxiliary valve is closed.

References Cited

UNITED STATES PATENTS

| 157,791 | 12/1874 | Cameron | 188—88 |
| 2,148,839 | 2/1939 | Rossman et al. | |
| 2,678,114 | 5/1954 | De Koning et al. | 188—88 |

FOREIGN PATENTS

| 635,607 | 4/1952 | Great Britain. |
| 699,949 | 11/1953 | Great Britain. |
| 767,977 | 2/1957 | Great Britain. |

GEORGE E. A. HALVOSA, *Primary Examiner.*

U.S. Cl. X.R.

137—508, 512.2, 513.3; 188—88, 100